United States Patent [19]

Kojima

[11] 4,420,172

[45] Dec. 13, 1983

[54] RING JOINT FOR SEATBELT SYSTEM

[75] Inventor: Ikuzo Kojima, Nagoya, Japan

[73] Assignees: Toyota Jidosha Kogyo Kabushiki Kaisha; Kabushiki-Kaisha Tokai-Rika-Denki-Seisakusho, both of Aichi, Japan

[21] Appl. No.: 326,114

[22] Filed: Nov. 30, 1981

[30] Foreign Application Priority Data

Jun. 9, 1981 [JP] Japan ............................. 56-84439[U]

[51] Int. Cl.³ .............................................. B60R 21/10
[52] U.S. Cl. ..................................... 280/802; 280/808
[58] Field of Search ............................... 280/801–804, 280/806, 808

[56] References Cited

U.S. PATENT DOCUMENTS 4,310,177  1/1982  Rodgers et al. ...................... 280/802
4,364,584  12/1982 Rodgers et al. ...................... 280/802
4,371,193  2/1983  Takada ................................. 280/806

Primary Examiner—Robert R. Song
Assistant Examiner—Dennis Pedder
Attorney, Agent, or Firm—Parkhurst & Oliff

[57] ABSTRACT

A ring joint used in a three-point seatbelt system having an outer webbing and an inner webbing, interposed between the intermediate portion of the outer webbing and the forward end of the inner webbing and adapted to allow the outer webbing to move freely in the longitudinal direction thereof in a normal condition, but preventing the outer webbing from moving in an emergency. Furthermore, a guide means prevents the inner webbing from moving in the widthwise direction thereof relative to the ring joint, whereby the inner webbing is not shifted in the widthwise direction thereof in an emergency, thereby enabling an occupant to be secured in a positively restrained state.

16 Claims, 10 Drawing Figures

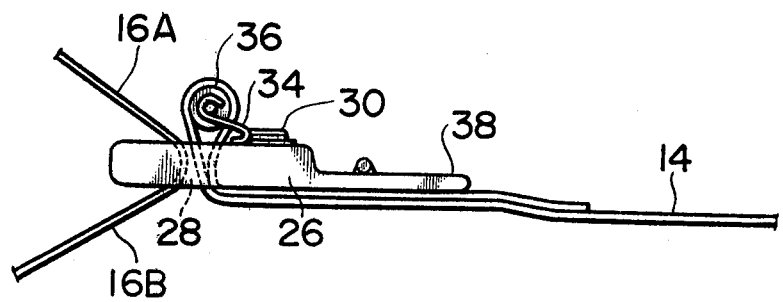
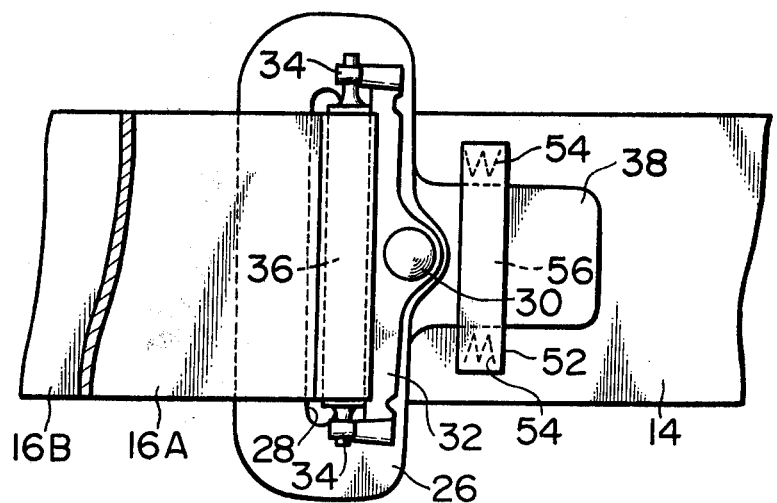

RING JOINT FOR SEATBELT SYSTEM

BACKGROUND OF THE INVENTION

1. Field of the Invention

This invention relates to a ring joint for connecting an inner webbing and an outer webbing to each other in a seatbelt system for protecting an occupant in a vehicular emergency.

2. Description of the Prior Art

Ring joints have been used in seatbelt systems having an outer webbing and an inner webbing and so arranged that a ring joint base is secured to the forward end portion of the inner webbing, and the intermediate portion of the outer webbing is partially wound around this base.

With this ring joint, the occupant can change the length of the lap restraining portion and the length of the shoulder restraining portion of the outer webbing, making an accommodation therebetween when the webbings are to be fastened about him, so that he can be brought into the optimum webbing fastened state when occupants of different physical builds enter the vehicle or when an occupant changes his driving posture during driving. However, in the seatbelt system using the ring joint as described above, when a deflected load acts on the webbings in a vehicular emergency, a contact portion of the outer webbing, and also a contact portion of the inner webbing may move in the widthwise directions of the webbings in the ring joint, thereby possibly causing shifting of the webbings.

When the webbing or webbings shift in the widthwise directions, the shift may cause decreased tensile strength in the longitudinal direction of the webbing or webbings.

SUMMARY OF THE INVENTION

The present invention has been developed to obviate the above described disadvantage of the prior art and has as its object the provision of a ring joint for preventing the webbing or webbings from shifting in the widthwise direction.

In the ring joint according to the present invention, a guide means is provided between the ring joint base and the inner webbing, whereby the webbings are allowed to move relative to each other in the longitudinal directions thereof while relative movement in the widthwise directions is controlled.

Description will hereunder be given of certain embodiments of the present invention with reference to the accompanying drawings.

BRIEF DESCRIPTION OF THE DRAWINGS

FIG. 9 is a bottom view of the ring joint of FIG. 8; and

FIG. 10 is a front view showing a fourth embodiment of the present invention.

DESCRIPTION OF THE PREFERRED EMBODIMENTS

Figure 1:
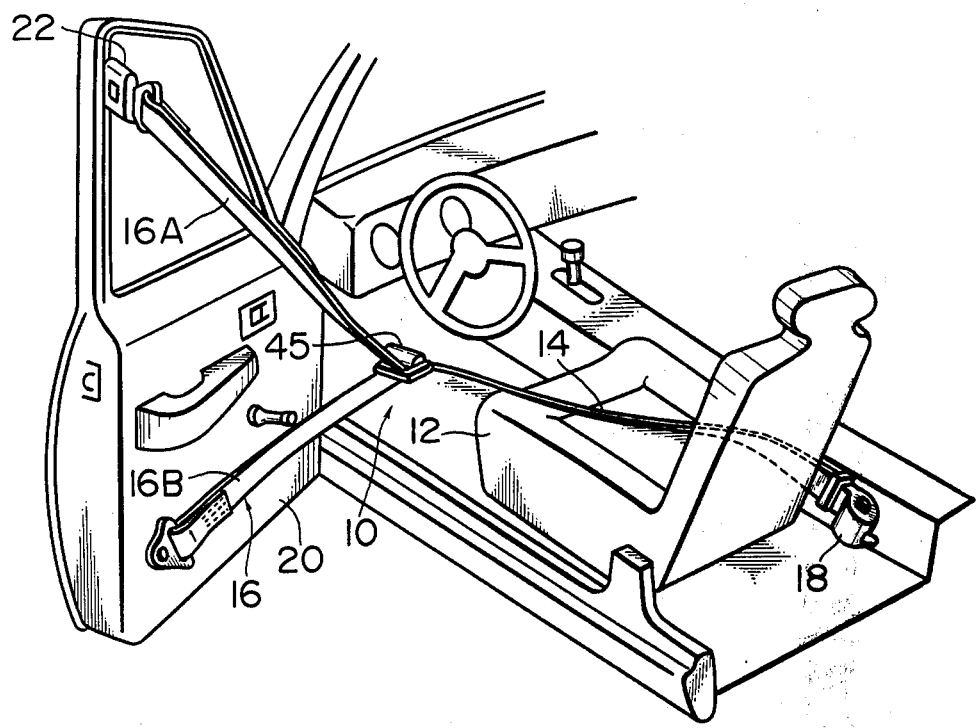
FIG. 1 is a perspective view showing a vehicle to which is applied a ring joint according to the present invention.
Figure 2:
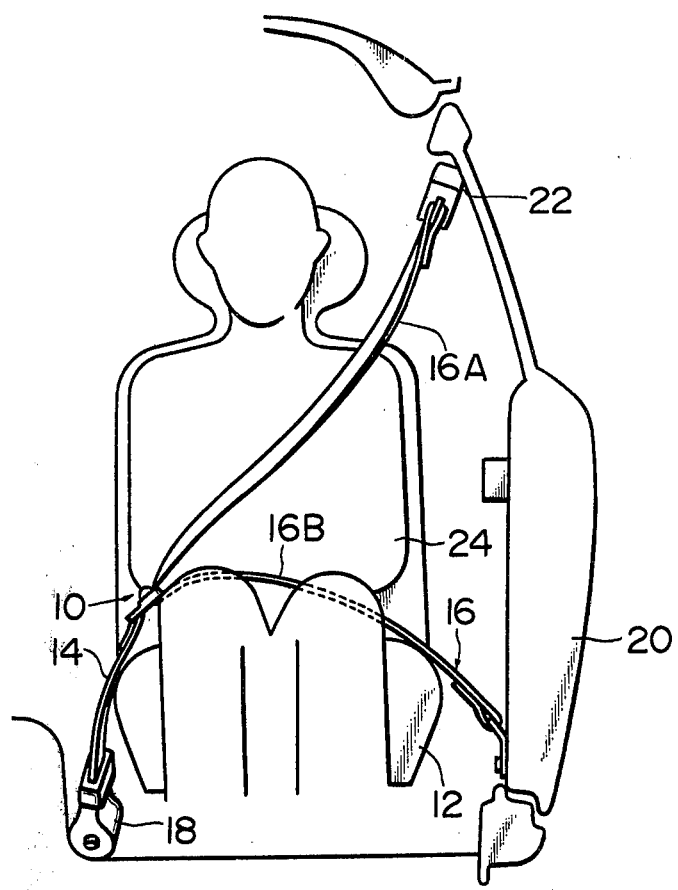
FIG. 2 is a front view as viewed from forward of the vehicle in FIG. 1 showing a closed state of a door after an occupant has entered the vehicle.

FIGS. 1 and 2 show a seatbelt system to which is applied a ring joint 10 according to the present invention, in which an occupant to be seated at a seat 12 is brought into a seatbelt fastened state by means of an inner webbing 14 and an outer webbing 16.

The inner webbing 14 is wound into a retractor 18 mounted at substantially the center of the vehicle, and the forward end portion thereof has secured thereto the ring joint 10. The retractor 18 winds up on the inner winding 14 by an urging force thereof and incorporates therein an inertia lock mechanism for instantly stopping the windout of the inner webbing 14 in an emergency.

The outer webbing 16 is secured at one end thereof to the lower rear portion of a door 20 and at the other end thereof to the upper rear portion of the door 20 through a buckle device 22, and turned back at the intermediate portion thereof by the ring joint 10. Here, one portion of the outer webbing 16 turned back by the ring joint 16 forms a shoulder restraining portion 16A and the other portion thereof a lap restraining portion 16B.

Consequently, when an occupant 24 opens the door 20 as shown in FIG. 1, the outer webbing 16 is moved forwardly in the vehicle in accordance with a circularly arcuate door opening motion, whereby a space for the occupant 24 to enter the vehicle is formed between the webbings 14, 16 and the seat 12. When the occupant 24 closes the door 20 upon being seated at the seat 12, the outer webbing 16 is moved rearwardly in the vehicle conversely to the above in accordance with the circularly arcuate door closing motion, thereby automatically fastening the webbings 14 and 16 about the occupant 24.

Figure 3:
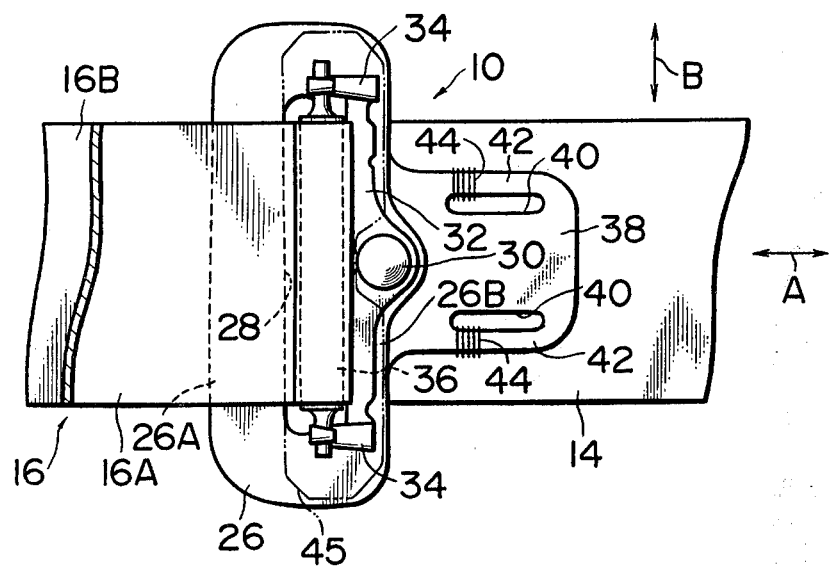
FIG. 3 is a front view showing a first embodiment of the ring joint according to the present invention.

A detailed description will now be given of the ring joint 10 with reference to FIGS. 3 and 4. A base 26 is formed of an annulus provided at the center thereof with a slot 28 and is made of a steel base material, the outer surface of which is coated with synthetic resin. The intermediate portion of the outer webbing 16 is inserted through this slot 28 and turned back thereat, so that it is partially wound around one of the longer sides 26A of the base 26.

Fixed on the other 26B of the longer sides of the base 26 through a rivet 30 is a sheet spring 32. Extended from opposite end portions of this sheet spring 32 are a pair of arms 34, at the forward end portions of which are supported opposite end portions of a lock bar 36. An end of the inner webbing 14 is inserted through the slot 28, partially wound around the lock bar 36, turned around, inserted through the slot 28 again, and then sewn onto the intermediate portion of the inner webbing 14.

Here, the sheet spring 32, in its normal condition, holds the lock bar 36 and the contact portion of the inner webbing 14 partially wound around the lock bar 36 in a state where the lock bar 36 and the contact portion are separated from the slot 28 and the outer webbing 16 which passes through the slot 28. However, when a relative load acts on the inner webbing 14 and the joint base 26 (in directions indicated by a double-headed arrow A), the sheet spring 32 is deflected to bring the lock bar 36 into pressing contact with the slot 28, whereby the intermediate portion of the outer webbing 16 is locked between the lock bar 36 and the base 26, so that the outer webbing 16 is prevented from moving in the longitudinal direction thereof.

A plate-like projection 38 extends from the other 26B of the longer sides of the joint base 26 toward an opposite direction from the slot 28. A pair of slots 40 are formed in this projection 38 in the longitudinal direction of the webbing, and portions of the projection 38 defined by the slots 40 and the outer side edges of the projection 38 form narrow-width portions 42. Sewing yarns 44 are partially wound around the narrow-width portions 42, whereby the narrow-width portions 42 are sewn onto the inner webbing 14. Consequently, parts of the sewing yarns 44 extend through the slots 40, so that the projection 38 is movable by the length of the slot 40 in the longitudinal direction of the inner webbing 14. In other words, the projection 38 and the inner webbing 14 are relatively movable from a positional relationship between the projection 38 and the inner webbing 14 as shown in FIG. 3 to a positional relationship shown in FIG. 5.

However, the sewing yarns 44 prevent the narrow-width portions 42 from moving in the widthwise direction of the webbing (indicated by a double-headed arrow B), whereby the inner webbing 14 cannot be shifted in its widthwise direction with respect to the ring joint 10 and particularly to the lock bar 36. In addition, the base 26 is provided thereon with a dust cover 45.

A description will hereunder be given of the action of this embodiment. The ring joint 10 is assembled to the inner webbing 14 and the outer webbing 16 in the states shown in FIGS. 3 and 4.

FIG. 1 shows the state where the occupant 24 has opened the door 20 to enter the vehicle, in which the space for allowing the occupant 24 to enter the vehicle is formed between the webbings 14, 16 and the seat 12.

When the occupant 24 closes the door 20 after he has been seated at the seat 12, the inner webbing 14 is wound into the retractor 18, whereby the state shown in FIG. 2 is brought about, so that the inner webbing 14 and the other webbing 16 can be automatically fastened about the occupant 24.

Figure 4:
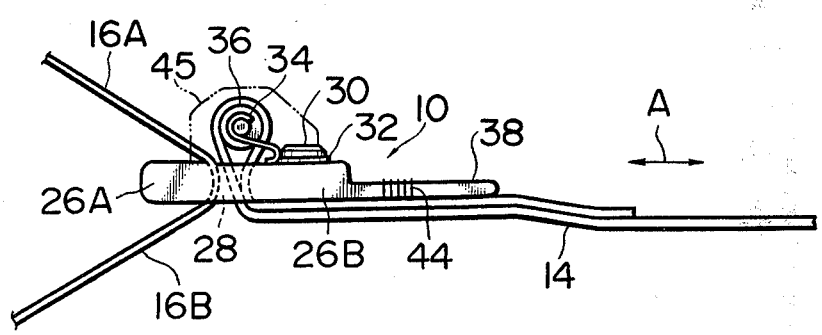
FIG. 4 is a bottom view of the ring joint of FIG. 3.

During the normal running condition of the vehicle, the lock bar 36 is separated from the slot 28 of the joint base 26 as shown in FIG. 4, so that the outer webbing 16 can freely pass through the slot 28. Consequently, the length of the shoulder restraining portion 16A and the length of the lap restraining portion 16B of the outer webbing 16 can be freely changed with an accommodation being made therebetween, so that the optimum driving posture can be rendered to occupants of different physical build from one to another. Furthermore when the occupant 24 changes his driving posture during the normal running condition of the vehicle, the lengths of the shoulder restraining portion 16A and the lap restraining portion 16B can be varied in accordance with the driving posture of the occupant 24 after a change in his driving posture.

When the vehicle has entered an emergency situation such as a collision, the retractor 18 instantly stops the windout of the inner webbing 14 by means of an inertia lock mechanism incorporated therein. At the same time, the occupant 24 moves in the direction of the collision of the vehicle under an inertial force, whereby a high tensile force acts on the webbings 14 and 16. This tensile force causes the lock bar 36 to approach the slot 28, whereby the lock bar 36 brings the contact portion of the outer webbing 16 into pressing contact with one 26A of the longer sides of the joint base 26, so that the outer webbing 16 can be locked in its longitudinal movement. With this arrangement, the outer webbing 16 cannot move through the slot 28, so that the lengths of the shoulder restraining portion 16A and the lap restraining portion 16B become invariable. As a result, the occupant 24 can be positively restrained, whereby the occupant 24 is caused to sink into the seat 12, so that such a disadvantage as the shoulder restraining portion 16A coming into contact with his neck or therearound can be obviated.

Figure 5:
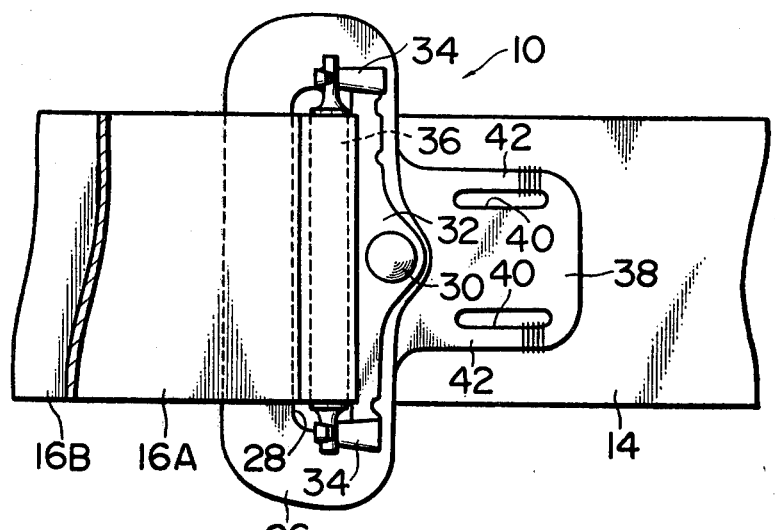
FIG. 5 is a view showing the first embodiment of the ring joint in an actuated position.

At the time of this locking, the inner webbing 14 and the base 26 are prevented from moving in the widthwise direction of the webbing, so that the contact portion of the inner webbing 14 partially wound around the lock bar 36 is not shifted in its widthwise direction. Consequently, even in an emergency the positional relationship of the base 26 with the inner webbing 14 is maintained as shown in FIG. 5, so that the contact portion of the outer webbing 16 partially wound around the joint base 26 is not shifted.

At the time of locking the lock bar 36, the inner webbing 14 and the projection 38 of the joint base 26 move relative to each other as a result of the sliding of the sewing yarns 44 on the narrow-width portions 42, so that the sewing yarns 44 do not hinder the movement of the lock bar 36.

Figure 6:
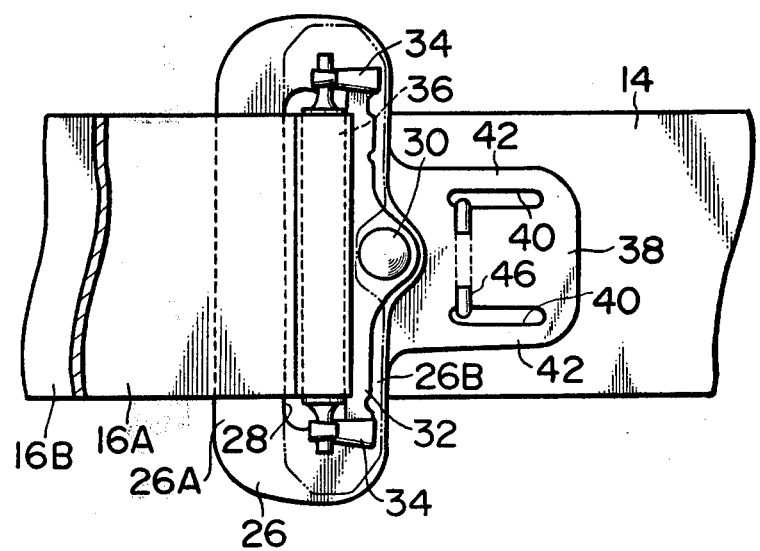
FIG. 6 is a front view showing a second embodiment of the present invention.
Figure 7:
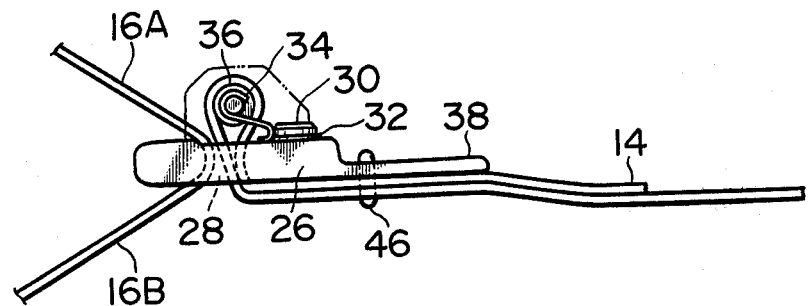
FIG. 7 is a bottom view of the ring joint of FIG. 6.

FIGS. 6 and 7 show a second embodiment of the present invention, in which a metal pin 46 is used as a guide member as different from the preceding embodiment. This metal pin 46 is previously bent into a U-shape, opposite ends of which penetrate through the inner webbing 14 and the slots 40 of the projection 38, and then, the forward end portions thereof are bent at right angles.

With this arrangement, the metal pin 46 restricts the relative movement between the inner webbing 14 and the projection 38 in the widthwise direction of the webbing, while it allows relative movement by the length of slot 40 in the longitudinal direction of the webbing.

A metal pin is used in this embodiment so that durability can be improved as compared with the sewing yarns in the preceding embodiment.

Figure 8:
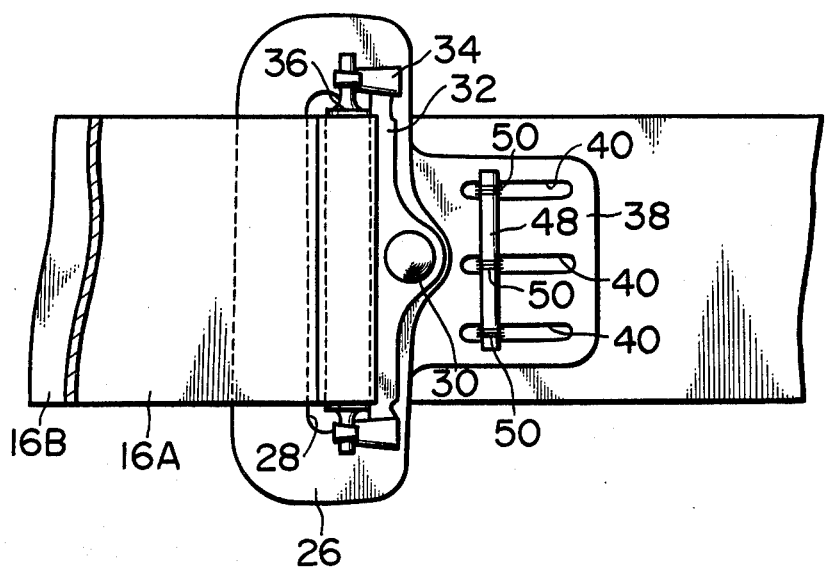
FIG. 8 is a front view showing a third embodiment of the present invention.

FIGS. 8 and 9 show a third embodiment of the present invention. In this embodiment, a metal bar 48 is abutted against the surface of the projection 38 opposite to the inner webbing 14, and sewn onto the inner webbing 14 with sewing yarns 50 extending through the slots 40. Consequently, the metal bar 48 clamps the projection 38 in cooperation with the inner webbing 14.

In this embodiment as well, the sewing yarns 50 extend through the slots 40 of the projection 38 thereby to prevent relative movement between the joint base 26 and the inner webbing 14 in the widthwise direction of the webbing while allowing relative movement between the projection 38 and the inner webbing 14 by the length of slot 40 in the longitudinal direction of the webbing.

In this embodiment, the sewing yarns 50 do not directly contact the projection 38, whereby the sewing yarns 50 do not slide on the projection 38, so that the sewing yarns 50 can avoid being worn or broken. Additionally, during the relative movement between the projection 38 and the inner webbing 14, the metal bar 48 slides on the surface of the projection 38, whereby frictional resistance between the projection 38 and the inner webbing 14 is low, so that relative movement therebetween can be effected smoothly.

FIG. 10 shows a fourth embodiment of the present invention, in which a short webbing 52 is used as the guide member.

Opposite end portions of this short webbing 52 are sewn onto two positions spaced apart from each other in the widthwise direction of the inner webbing 14 by use of sewing yarns 54, whereby a guide space 56 is formed between the middle portion of the short webbing 52 and the inner webbing 14. The projection 38 projected from the joint base 26 is inserted through this guide space 56.

In consequence, the sewing yarns 54 restrict movement of the projection 38 in the widthwise direction of the inner webbing 14, while allowing the relative movement between the inner webbing 14 and the projection 38 in the longitudinal direction of the webbing, so that the outer webbing 16 can be locked and the inner webbing 14 can avoid being shifted in an emergency in the same manner as in the preceding embodiments.

Furthermore, in this embodiment, when the relative movement between the inner webbing 14 and the joint base 26 in the longitudinal direction of the webbing becomes unusually large in value, the projection 38 can be drawn out of the guide space 56, which would otherwise result in damages of the parts as seen in the respective preceding embodiments, so that the ring joint can be reused as it is.

As has been described hereinabove, the ring joint for the seatbelt system according to the present invention is provided therein with guide means allowing relative movement between the ring joint base and the inner webbing in the longitudinal direction of the webbing, while restricting relative movement therebetween in the widthwise direction of the webbing. Thus such an outstanding advantage can be achieved that, when a deflected load acts in the widthwise direction of the webbings, they are prevented from being shifted, thereby enabling more perfect webbing restraining performance of the seatbelt system.

What is claimed is:

1. A ring joint for connecting an inner webbing and an outer webbing to each other in a seatbelt system for protecting an occupant in a vehicular emergency, comprising:
   (a) a ring joint base secured to the forward end portion of the inner webbing and having inserted therethrough an intermediate portion of the outer webbing;
   (b) lock means for allowing said base to move relative to the inner webbing in a longitudinal direction of the inner webbing and for interlocking the outer webbing and the base due to said relative movement; and
   (c) guide means provided between the base and the inner webbing for allowing relative movement between the base and the inner webbing in the longitudinal direction of the inner webbing, but restricting relative movement between the base and the inner webbing in a widthwise direction of the inner webbing, whereby the inner webbing is prevented from being shifted in the widthwise direction thereof, thereby providing a reliably locked state of the inner webbing.

2. A ring joint as set forth in claim 1, wherein said guide means includes: at least one slot formed in the base and directed in the longitudinal direction of the inner webbing; and a guide member, one part of which is secured to the inner webbing and another part of which extends through the slot for restricting relative movement between the inner webbing and the base.

3. A ring joint as set forth in claim 2, wherein said guide member is sewing yarn sewn onto the inner webbing.

4. A ring joint as set forth in claim 3, wherein said slot forms a narrow-width portion between the slot and the opposite side edge of the joint base and said sewing yarn is partially wound around said narrow-width portion.

5. A ring joint as set forth in claim 3, wherein a bar member is disposed on a surface of said base opposite to the inner webbing, directed transversely to the longitudinal direction of the slot and sewn onto the inner webbing, and the sewing yarn between the inner webbing and said bar member extends through the slot.

6. A ring joint as set forth in claim 5, wherein said bar member is a round metal bar abutted against the base for sliding on the base in a vehicular emergency.

7. A ring joint as set forth in claim 2, wherein said guide member is a metal pin extending through the inner webbing and the slot.

8. A ring joint as set forth in claim 7, wherein two said slots are provided parallel to each other and opposite end portions of said metal pin extend through the slot and are bent along the base.

9. A ring as set forth in claim 1, wherein said guide means is attached at opposite end portions thereof onto the inner webbing and a middle portion thereof allows the base to move in the longitudinal direction of the inner webbing and restricts the base from moving in the widthwise direction of the inner webbing.

10. A ring joint as set forth in claim 9, wherein said guide means is a short webbing.

11. A ring joint as set forth in claim 10, wherein said base is formed with a projection extending in the longitudinal direction of the inner webbing, said projection being inserted through a space formed between said short webbing and the inner webbing.

12. A ring joint provided on an outer webbing secured at opposite ends to a door and provided between an intermediate portion of the outer webbing and a forward end portion of an inner webbing, comprising:
   (a) a base provided therein with an insert opening for receiving said outer webbing;
   (b) a lock bar secured to said base and partially wound therearound with the inner webbing, whereby an increased tensile force in the inner webbing brings the outer webbing in pressing contact with the base thereby to lock the outer webbing;
   (c) a projection projected from said base in a longitudinal direction of the inner webbing and formed with at least one slot directed in the longitudinal direction of the inner webbing; and
   (d) guide means extending through the inner webbing and said slot of the projection, whereby the base is allowed to move relative to the inner webbing in the longitudinal direction of the inner webbing, and restricted from moving relative to the inner webbing in a widthwise direction of the inner webbing, thereby preventing the inner webbing from being shifted in the widthwise direction thereof.

13. A ring joint as set forth in claim 12, wherein said guide means is sewing yarn sewn onto the inner webbing.

14. A ring joint as set forth in claim 13, wherein said guide means is a metal pin extending through the webbing.

15. A ring joint provided on an outer webbing secured at opposite ends to a door and provided between an intermediate portion of the outer webbing and a forward end portion of an inner webbing, comprising:
 (a) a base provided therein with an insert opening for receiving an outer webbing;
 (b) a lock bar secured to said base and partially wound therearound with the inner webbing, whereby an increased tensile force in the inner webbing brings the outer webbing in pressing contact with the base thereby to lock the outer webbing;
 (c) a projection projected from said base in a longitudinal direction of the inner webbing; and
 (d) guide means attached at opposite end portions thereof onto the inner webbing and receiving said projection through a space formed between the inner webbing and a middle portion thereof in a manner to restrict said projection from moving in a widthwise direction of the webbing and to guide said projection to be movable in the longitudinal direction of the webbing, whereby the inner webbing is prevented from being shifted in the widthwise direction of the inner webbing at the time of locking.

16. A ring joint as set forth in claim 15, wherein said guide means is a short webbing.

* * * * *